United States Patent [19]

McClean

[11] 3,975,479
[45] Aug. 17, 1976

[54] METHOD OF FABRICATING A REINFORCED PLASTIC ARTICLE

[75] Inventor: William George McClean, Milwaukee, Wis.

[73] Assignee: McClean Anderson, Inc., Milwaukee, Wis.

[22] Filed: Mar. 9, 1973

[21] Appl. No.: 339,920

[52] U.S. Cl. ............................. 264/102; 264/128; 264/257; 264/DIG. 53; 264/DIG. 78
[51] Int. Cl.² ................................... B29H 9/02
[58] Field of Search ............ 264/102, 255, DIG. 78, 264/DIG. 53, 101, 90, 128, 112, 257, 93

[56] References Cited
UNITED STATES PATENTS

| | | | |
|---|---|---|---|
| 2,633,605 | 4/1953 | Brucker | 264/257 |
| 2,815,534 | 12/1957 | Ising et al. | 264/257 |
| 2,859,936 | 11/1958 | Warnken | 264/DIG. 53 |
| 2,949,640 | 8/1960 | Collins et al. | 264/102 |
| 3,084,088 | 4/1963 | Hunkeler | 264/102 |
| 3,087,201 | 4/1963 | Williams et al. | 264/257 |
| 3,154,618 | 10/1964 | Baer et al. | 264/40 |
| 3,188,369 | 6/1965 | Guthrie | 264/128 |
| 3,200,180 | 8/1965 | Russ et al. | 264/102 |
| 3,656,360 | 4/1972 | Fix | 264/102 |

*Primary Examiner*—Robert F. White
*Assistant Examiner*—T. E. Balhoff
*Attorney, Agent, or Firm*—Andrus, Sceales, Starke & Sawall

[57] ABSTRACT

A method of fabricating a reinforced plastic tubular article. A mandrel is positioned within a mold in spaced relation to the inner surface of the mold. Dry reinforcing material, in the form of fibrous or particulate material or a combination of both, is located in the annular space between the mandrel and the mold. The interior of the mold is evacuated to remove gas from the mold as well as from the voids within the reinforcing material. An uncured thermosetting resin system, which was mixed under vacuum conditions to remove gas from the system, is introduced into the mold. Pressure is applied to the resin to thoroughly impregnate the reinforcing material with the resin. The resin is then cured by heating while the pressure is maintained on the resin. The resulting cured product has a smooth outer surface which facilitates the attachment of coupling members and has improved mechanical properties. If a smooth outer surface is not desired, the fibrous material can be impregnated in an over sized mold or chamber, and after impregnation, transferred to a separate oven for curing.

6 Claims, 6 Drawing Figures

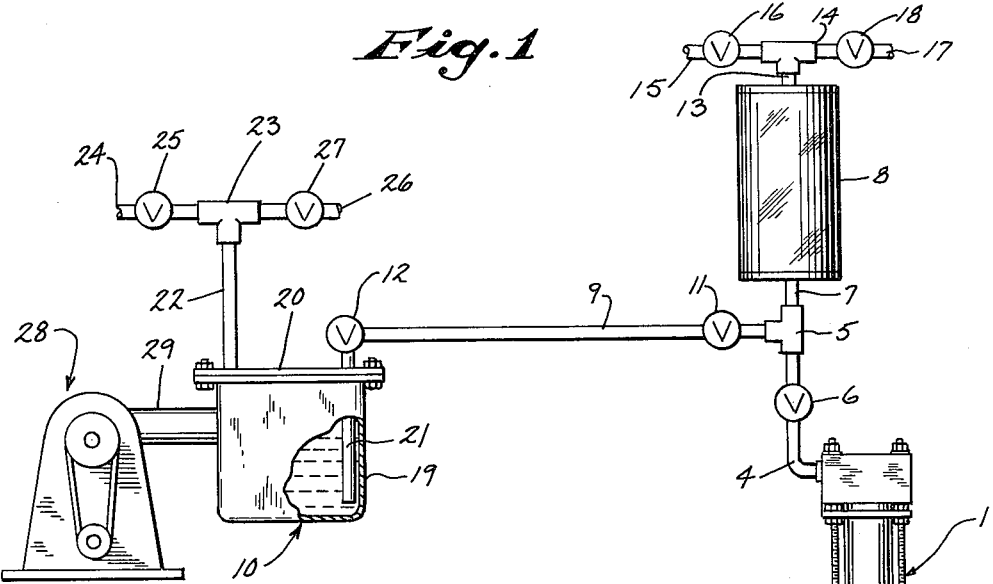
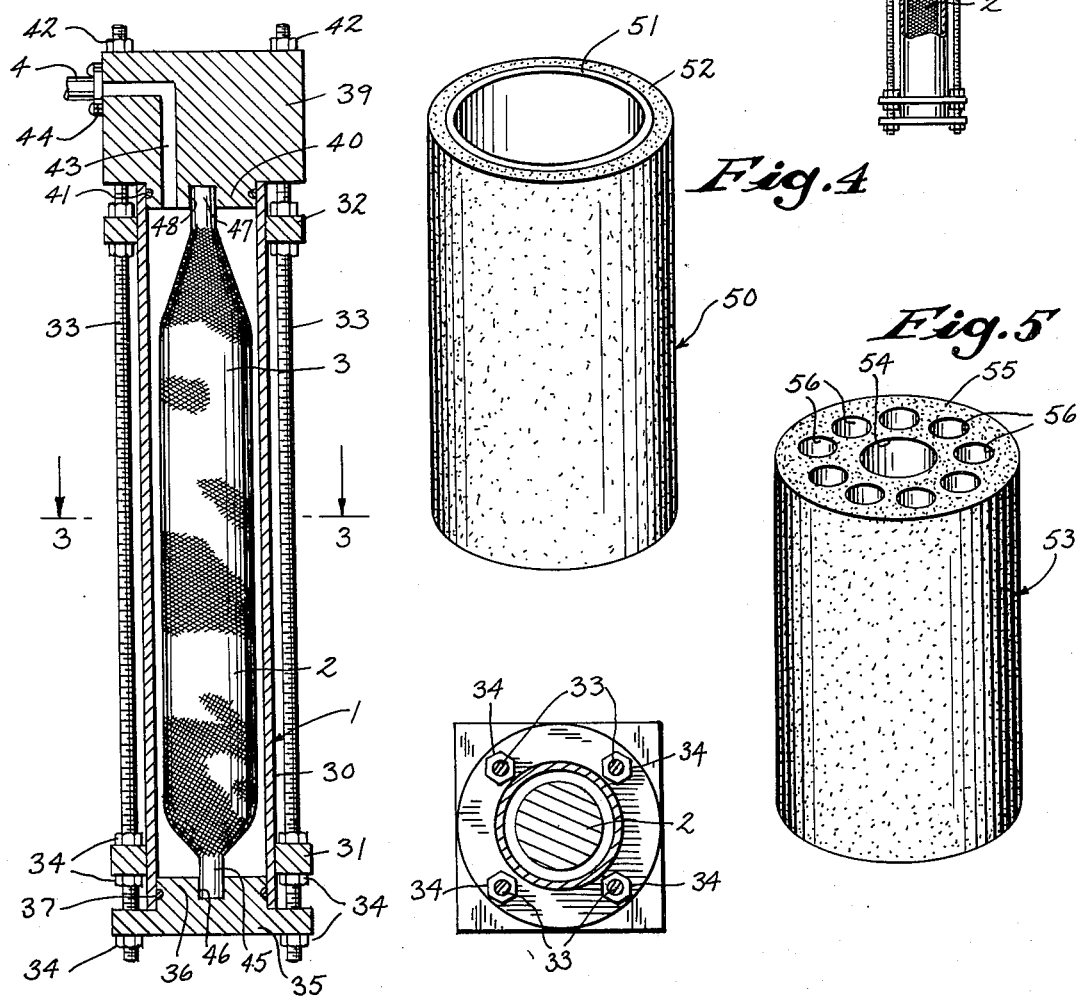

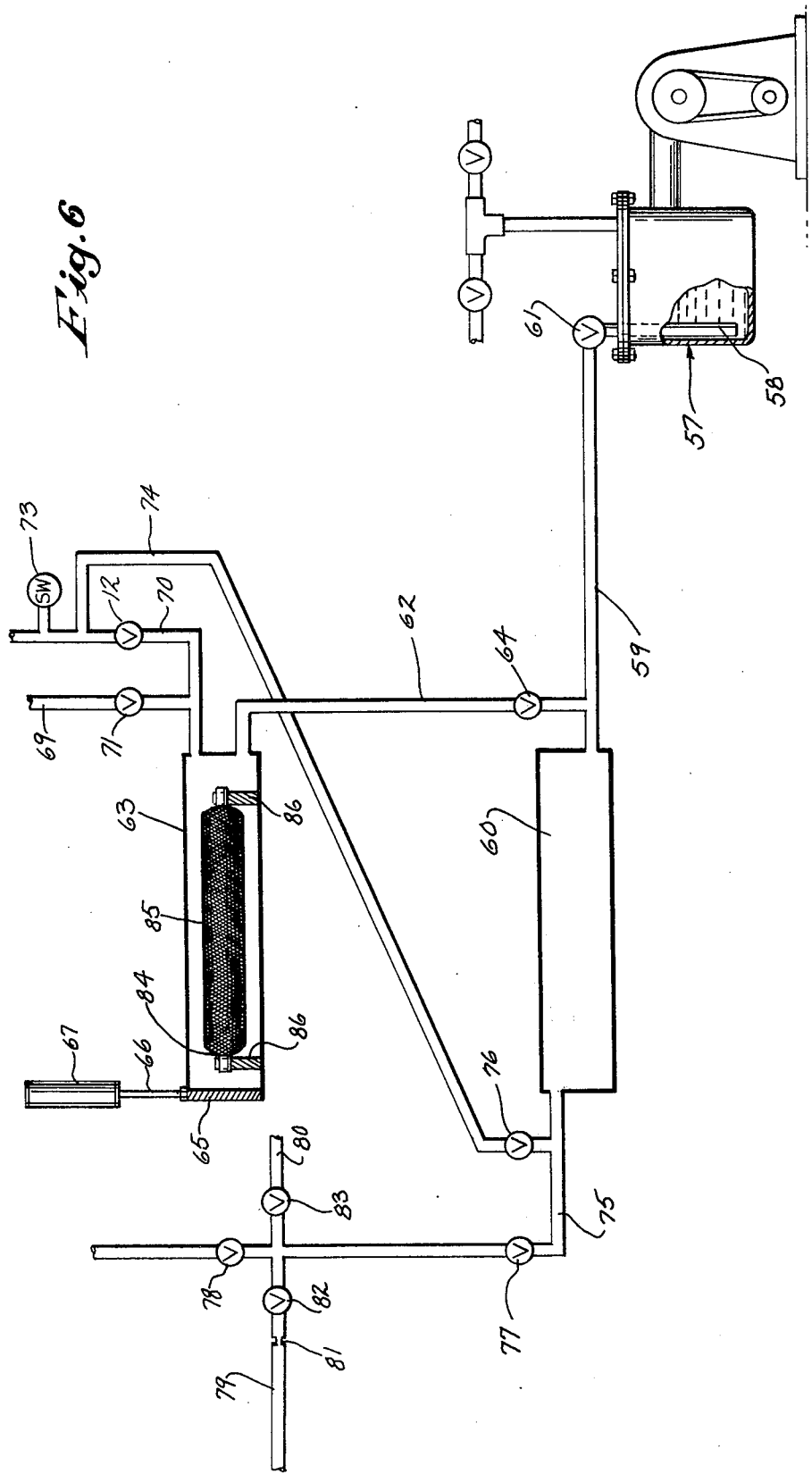

METHOD OF FABRICATING A REINFORCED PLASTIC ARTICLE

BACKGROUND OF THE INVENTION

Reinforced plastic pipe or other tubular articles are normally fabricated by a filament winding operation in which resin coated strands are wound on a mandrel in a series of superimposed layers. After the desired number of layers have been wound to achieve the necessary strength requirements, the resin is cured and the resulting product is stripped from the mandrel.

In the conventional filament winding operation, the speed of winding is determined primarily by the speed at which the strands can be coated or impregnated with the uncured resin. Normally, the strand of reinforcing material is impregnated with resin by passing the strand through a resin bath. If the speed of travel of the strand is too fast through the resin bath, there will not be sufficient impregnation of the fibrous strand. Furthermore, if the resin impregnated strand is wound at too rapid a rate on the mandrel, the liquid resin will be thrown from the strand by centrifugal force and shielding is required to prevent the thrown resin from contacting outside objects.

In the past, attempts have been made to increase the speed of impregnation of the fibrous strands by heating the resin to decrease its viscosity. While the less viscous resin will more readily impregnate the fibrous strands, the heating substantially shortens the pot life of the resin.

A further problem that has arisen in the past with conventional filament winding processes is that the normal operation for impregnating the fibrous strands with resin does not completely eliminate all air or gas from the voids or interstices of the fibrous strands nor does it remove all gas entrained in the resin. If the gas is not completely removed, the mechanical properties of the cured article will be adversely affected.

Conventional filament winding processes are also limited to the use of certain resin systems, such as epoxy and polyester resins, which do not require pressure during the curing stage. Less expensive resins, such as the phenolic resins, cannot normally be utilized because they require pressure during the curing operation.

As a further disadvantage, pipe sections produced by conventional filament winding operations have relatively rough outer surfaces, and the rough surface is a disadvantage when using external coupling members to couple lengths of pipe together. Due to the roughness of the outer surface, it is generally necessary to machine the outer surface of the pipe so that the couplings will seat against a smooth surface.

It is also desirable in a filament wound article to have a resin-rich outer layer which will prevent fiber blooming when the tubular article is subjected to extreme weather conditions. In the normal filament winding operation, the outer surface is not resin-rich, but contains the same proportion of fibers and resin as the remainder of the wall of the pipe. When a pipe of this type is exposed to extreme weather conditions, the fibers at the outer surface tend to "bloom" or break away and become exposed, which is an undesirable characteristic.

SUMMARY OF THE INVENTION

This invention relates to a method of fabricating a reinforced plastic tubular article in which the resulting article has both a smooth inner and outer surface and has improved mechanical properties. According to the invention, the article can be reinforced with either fibrous or particulate reinforcement, or in some cases, a combination of both. In the method of the invention, a mandrel is positioned within a mold in spaced relation to the inner surface of the mold to provide an annular clearance therebetween. If the tubular article is to be reinforced with fibrous reinforcement, the fibrous material is applied to the mandrel in the dry state, either by winding substantially continuous strands about the mandrel or applying fibrous batts or fabric to the mandrel. If particulate or granular reinforcement is to be used in the article, the particulate material is introduced in the clearance between the mandrel and the mold. A vacuum is then drawn on the mold to remove the air from the mold, as well as the air from within the interstices or voids in the fibrous or particulate reinforcing material.

The components of the resin system to be employed as the binder are mechanically mixed and are subject to a vacuum to withdraw substantially all gas from the resin. While maintaining the evacuated condition in the mold, the resin is introduced into the mold. After the resin has substantially filled the mold, pressure in the range of 15 to 3000 psi is applied to the resin which forces the resin into the reinforcing material to thoroughly impregnate the same.

After impregnation of the reinforcing material, the resin is heated to cure the same, while maintaining the pressure on the resin. After curing, the tubular article is stripped from the mandrel and the mold and the resulting product has smooth inner and outer surfaces, as well as substantially improved mechanical properties.

The method of the invention is applicable to the use of fibrous reinforcement or granular or particulate reinforcement. In some instances a combination of fibrous and particulate reinforcement can be utilized.

The process of the invention has substantial advantages over conventional filament winding operations in that the mandrel can be wound with fibrous strands in a dry state and this not only increases the speed of winding but eliminates the problems which normally accompany the use of a resin impregnated strand.

As both the reinforcing material and the resin are subjected to a vacuum, substantially all traces of gas are removed from both the resin and the reinforcement so that the resulting tubular article does not contain any gas pockets or voids and this substantially improves the mechanical properties of the tubular article.

As the resin is cured under pressure, a shorter curing time is provided. Furthermore, the pressure cure enables less expensive resins, such as the ephenolic resins to be utilized as the binding material.

As the tubular article has a smooth outer surface, couplings can be readily attached to the outer surface without the necessity of machining the surface as is normally required with conventional filament wound tubular articles or pipe sections.

In a modified form of the invention where a smooth outer surface is not desired, the fibrous windings on one or more mandrels are impregnated with resin in an oversized chamber, and after impregnation, the mandrels are transferred to a separate oven for curing of the resin with or without the application of pressure during curing.

Other objects and advantages will appear in the course of the following description.

DESCRIPTION OF THE DRAWINGS

The drawings illustrate the best mode presently contemplated of carrying out the invention.

In the drawings:

FIG. 1 is a schematic view showing the apparatus utilized in the process of the invention;

FIG. 2 is a longitudinal section of the mold used in the process with a wound mandrel being located therein;

FIG. 3 is a section taken along line 3—3 of FIG. 2;

FIG. 4 is a perspective view of a modofied form of the product having an inner section reinforced with fibrous material and an outer section reinforced by particulate material;

FIG. 5 is a perspective view of a further modified form of product by the process of the invention; and FIG. 6 is a schematic view of a modified form of the process of the invention.

DESCRIPTION OF THE PREFERRED EMBODIMENT

FIG. 1 illustrates the apparatus for carrying out the process of the invention in fabricating a fibrous reinforced resin article. As shown in FIG. 1, a hollow cylindrical mold or die 1 contains a mandrel 2 which is centered within the mold and spaced from the inner surface of the mold. Dry fibrous material 3, either in the form of substantially continuous helical windings or short haphazardly arranged fibers, is applied to the outer surface of the mandrel 2.

A conduit or line 4 connects one end of the mold 1 with one arm of a T-fitting 5 and a valve 6 is located within the line 4. The opposite arm of the T-fitting 5 is connected by a line 7 to the lower end of a transparent reservoir 8 which has a volume greater than the volume of the mold 1. The stem of the T-fitting 5 is connected by a line 9 to a resin mixing vessel 10. Valves 11 and 12 are located within the line 9.

The upper end of the reservoir 8 is connected to both a source of vacuum and pressure through a line 13. Line 13 is attached to the stem of a T-fitting 14, while one arm of the T-fitting 14 is connected to a line 15 which in turn is connected to a source of vacuum, such as a vacuum pump. A valve 16 is located in line 15. The opposite arm of the T-fitting 14 is connected to a source of pressure, such as a compressor, by a line 17 and a valve 18 is located within the line 17.

The mixing vessel 10 includes a container 19 adapted to contain the components of the resin system. A lid 20 encloses the upper end of container 19 and a dip tube 21 is connected to the line 9 and extends downwardly through lid 20 to a location near the bottom of the container. The lid 20 is bolted or clamped in sealed relationship to the upper flange of the container 19 to provide an air-tight mixing vessel.

The interior of the vessel 10 is also connected to both a source of vacuum and a source of either atmospheric pressure or superatmospheric pressure. In this regard a line 22 is connected between the lid 20 and a T-fitting 23. One arm of the T-fitting 23 is connected by a line 24 to a source of vacuum, such as a vacuum pump, and a valve 25 is connected in the line 24. The other arm of the T-fitting 23 is open through line 26 to the atmosphere, and a valve 27 is located in the line 26. Alternately, the line 26 could be connected to a source of superatmospheric pressure, such as a compressor.

To mix the components of the resin system in the vessel 10, a vibrating unit 28 is utilized which is connected by an arm 29 to the side wall of the container 19. The unit 28 acts to provide the vessel 10 with a fast oscillating or vibratory motion which completely blends or mixes the components of the resin system contained within the vessel. The particular agitating or mixing device to be employed is not critical and any conventional agitation apparatus can be utilized which will mix or blend the resin components together while the vessel 10 is evacuated.

The structure of the mold 1 is best illustrated in FIGS. 2 and 3. The mold 1 includes a generally cylindrical shell 30 that can be formed of metal, fiber reinforced plastic, or the like. When fabricating large diameter tubular articles, the use of a fiber reinforced plastic shell is more economical than a metal shell which would have to be machined.

The ends of the shell 30 project through rings 31 and 32, and a series of threaded tie rods 33 extend through openings in the rings and receive nuts 34 which serve to maintain the rings in position with respect to the shell 30. A head 35 is connected to one end of the shell, and the head includes a generally annular projection 36 which is inserted within the end of the shell and sealed to the inner surface of the shell by an O-ring or gasket 37. The ends of the tie rods 33 extend through openings in the head 35, and the head is clamped to the end of the shell by nuts 38 which are threaded onto the projecting ends of the tie rods 33.

The opposite end of the shell 30 is enclosed by a head 39 having an annular projection 40 which is received within the corresponding end of the shell 30. An O-ring or gasket 41 serves to seal the inner surface of the shell to the outer periphery of the annular projection 40.

As in the case of the head 35, the head 39 is provided with a series of openings and the tie rods 33 extend through the openings and nuts 42 are threaded onto the ends of the tie rods to clamp the head 39 to the end of the shell.

To introduce and withdraw resin from the shell, the head 39 is provided with a passage 43 and a fitting 44 serves to connect the line 4 with the passage 43.

To align the mandrel 2 within the shell 30, the end 45 of the mandrel is provided with a reduced diameter and is received within a hole 46 formed in the head 35. Similarly, the opposite end 47 of the mandrel is tapered and is received within a hole 48 in the head 39. Engagement of the mandrel ends 45 and 47 with the holes in the respective heads serves to center the mandrel 2 within the shell 30.

When fabricating a fiber reinforced tubular article, the fibrous material 3 is applied in dry form to the outer surface of the mandrel 2 prior to inserting the mandrel within the mold 1. The fibrous material can be in the form of long, substantially continuous strands or yarn which are wound about the mandrel in a helical pattern in a series of superimposed layers, as illustrated in FIG. 2, or the fibrous material can be in the form of woven fabric, braided tubing, or short, haphazardly arranged fibers, as in matting.

The particular nature of the fibrous material is not critical to the invention and may take the form of mineral fibers such as glass or asbestos; vegetable fibers such as cotton; animal fibers such as wool; synthetic fibers such as rayon, nylon, Dacron or Orlon; or metal fibers such as steel wire.

After the fibrous material has been applied in dry form to the outer surface of the mandrel, the mandrel is inserted within the shell 30 of the mold 1 with the end 47 of the mandrel being inserted within the hole 48 in head 39. The opposite head 35 is then assembled with the end 47 of the mandrel being received within the hole 46.

The outer surface of the fibrous material 3 will normally be in contact with, or spaced a slight distance from, the inner wall of the shell 30. The amount of clearance or space will depend on the particular article being fabricated and whether a subsequent outer layer of fiber or particulate reinforcing material is to be located around the inner fiber reinforced layer.

It is preferred to preheat the wound mandrel 2 before it is inserted within the mold 1. This preheating can be accomplished by heating the mandrel in an oven to a temperature generally in the range of 100° to 200° F. The preheating will tend to heat the resin subsequently introduced into the mold, thereby reducing the viscosity of the resin and facilitating impregnation of the fibers. Heating of the mandrel has the additional advantage of accelerating the cure of the resin.

Following the assembly of the mandrel 2 within the mold 1, valves 16, 6 and 11 are opened and the vacuum pump, not shown, is operated to draw a vacuum within the reservoir 8, the mold 1 and the lines 4 and 9. The vacuum or sub-atmospheric pressure serves to remove the air or other gas from the reservoir 8, the mold 1, lines 4 and 9, but also removes gas from the interior of the wound fibrous structure 3 on the mandrel. The amount of vacuum to be employed is not critical to the invention, and any amount of vacuum will aid in the withdrawal of gas. However, from a commercial standpoint it is preferred to employ a vacuum in the amount of about 50 to 1000 microns.

The particular resin to be employed in the process of the invention is not critical and any of the conventional thermosetting or thermoplastic resins can be utilized. The thermosetting resin may take the form of epoxy, polyester or phenolic resins, while polyvinyl chloride, polyethylene or nylon can be utilized as the thermoplastic resin.

The components of the resin system, including the resin, catalysts or curing agents, are initially preheated to a temperature below the decomposition temperature of the components and preferably in the range of about 100° to 300°F. The pre-heating serves to lower the viscosity of the resin system and aids in the subsequent impregnation of the fibrous material 3. If the resin is pre-heated, it is also preferred to pre-heat the mold to a temperature generally equivalent to the temperature of the resin and in the range of 100° to 300°F. The pre-heated components of the resin system are then introduced into the vessel 10 and the lid 20 is attached. Valve 25 is then opened to the vacuum source to draw a vacuum in line 22 and the interior of the vessel 10. The amount of vacuum utilized is not critical and any amount of vacuum will aid in removing gas from the vessel. However, for practical operation, a vacuum in an amount of 50 to 1000 microns is preferred.

The vibrating unit 28 is then operated to agitate or mix the resin components in the vessel 10, while the vacuum is drawn on the vessel through line 22. Any air or other gas which may have been incorporated within the resin components is thus expelled and withdrawn from the vessel. The resulting resin mixture is substantially free of air or gas.

After the resin has been sufficiently blended, the valve 25 is closed and valve 27 to the atmosphere is opened, along with valves 11 and 12. In addition, valves 6 and 16 are closed. This operates to transfer the resin mixture from the vessel 10 through the dip tube 21 and line 9 to the reservoir 8, due to the differential in pressures. As valve 6 is closed at this time, no resin will flow to the mold 1. The reservoir 8 is formed of a transparent material so that the level of the resin can be visually observed. After a volume of resin, greater than the effective volume of mold 1, has been transferred to the reservoir, the valve 11 is closed and valve 6 leading to the mold is opened so that the resin will flow into the mold filling the same. At this time the resin will penetrate the fibrous material 3 wound on the mandrel 2 by capillary action.

After the mold has been filled with the liquid resin, pressure is applied to the resin in the reservoir 8 to drive the resin into the voids and interstices of the fibrous material 3 to completely impregnate the same. This is accomplished by opening valve 18 so that a generally inert pressurized fluid, such as nitrogen, air or the like, will be admitted to the upper end of the reservoir 18. The pressure of the gas is generally in the range of 15 to 3000 psi, with about 500 psi being preferred. As previously noted, the pressure serves to drive the resin into the fibrous material to completely impregnate the same. While the pressure is maintained on the resin within the mold 1, the resin is heated to accelerate curing of the same. The heating can be accomplished in any desired manner and serves to heat the resin to a temperature generally in the range of 200° to 500°F, but below the decomposition of the components of the resin system. The particular temperature to be utilized depends on the resin system and the rate of curing desired.

Heating can be carried out by uncoupling the mold 1 from the system while maintaining the pressure on the resin within the mold and then placing the mold in an oven, or by positioning an electrical or fluid heating device around the mold, or by utilizing a hollow mandrel and introducing a heating medium into the interior of the mandrel.

After the resin has been heated for a period of about 5 to 60 minutes to cure the resin, the head 35 is removed from the mold and the cured fiber reinforced, plastic article is withdrawn from the mold. To facilitate removal of the article from the mold and subsequent stripping of the mandrel from the interior of the article, a conventional release agent can be applied to the outer surface of the mandrel 2, as well as to the inner surface of the shell 30.

If helical wound, continuous fibers are used as the reinforcement, the cured article will generally consist of about 50 to 90% by weight of fiber and the balance resin, while if randomly oriented fibers are utilized the cured article will normally contain from 30 to 60% by weight of fiber.

The resulting cured article has a smooth inner and outer surface. The smooth outer surface distinguishes over conventional filament wound articles which normally have a rough outer surface. The smooth outer surface of the article produced by the invention has decided advantages in that it enables couplings to be applied to the outer surface without the necessity of machining.

As both the resin and the fibrous reinforcement are de-gassed prior to impregnation, the possibility of air or other gases being trapped within the cured article is eliminated. This results in a product having superior mechanical properties over those produced by conventional techniques.

As the fibrous material can be wound on the mandrel in dry form, this substantially reduces the winding time as compared to processes in which resin-impregnated fibers are wound on a mandrel.

While the above description has illustrated the fabrication of a helically wound, fiber reinforced tubular article, it is also contemplated that particulate or granular reinforcement can be used with or without the fibrous reinforcement. FIG. 4 illustrates a tubular product 50 formed of an inner layer 51 of resin reinforced with helical wound fibers and an outer layer 52 formed of resin-bonded particulate material. The particulate or comminuted reinforcement can take the form of sand, fly ash, ground rubber, chopped glass fibers, talc, carbon, sawdust, silica, limestone, diatamaceous earth, and the like. The size of the particulate reinforcement is not critical and depends generally on the wall thickness of the tube. In most cases particulate material having a mesh size in the range of 10 to 100 can be employed, but the particle size can be up to 3/16 inch depending on the wall thickness of the tubular article. It may also be desirable to use a mixture of various particle sizes in order to fill the voids between the large particles and reduce the amount of resin necessary to impregnate the particulate material. The resin used to bind the particulate material can be the same resin used as a binder for the fibrous reinforcement or it can be a different resin.

If the particulate reinforcement is to be used in combination with the fibrous reinforcement, the mold and mandrel are designed to that there is a substantial clearance between the wound fibrous material and the inner surface of the mold and the particulate is introduced into this clearance. The procedure previously described is employed, and during the impregnation operation, the resin will not only impregnate the wound fibrous material but will also impregnate the particulate material. After curing of the resin under pressure as previously described, the resulting product will have a fiber reinforced resin inner layer and a thicker outer layer of particulate reinforced resin. The outer layer will preferably contain from about 30 to 95% by weight of the particulate or finely divided material, with the balance being resin. The inner helical wound layer provides high strength for the tubular article, while the outer layer increases the stiffness of the article, without undue cost.

FIG. 5 illustrates a multi-passage conduit that can be fabricated with the process of the invention. The conduit 53 includes an inner layer 54 of fiber reinforced resin and an outer layer 55 formed of a finely divided filler or particulate material bonded by resin. The outer layer 55 has a substantially greater thickness than the outer layer 52 of the tubular member 50 shown in FIG. 4, and is provided with a series of circularly spaced passages 56.

The conduit of FIG. 5 can be produced in the same manner as that described with respect to FIG. 4, except that rods are positioned in circularly spaced relation within the clearance between the shall 30 of the mold and the mandrel, and the particulate material is introduced into the clearance around the rods. After impregnation and curing of the resin to form the integrally bonded product, the rods are stripped from the product to provide the passages 56.

In some situations, the tubular article can be formed with only particulate reinforcing material and in this case, the mandrel, Without fibrous windings, is inerted within the mold and the particulate material is introduced into the annular space between the mandrel and the shell 30 of the mold. The same procedure is employed for impregnating the particulate material and curing the cured as heretofore described. The resulting tubular article would be utilized for lower strength applications which require high rigidity or stiffness.

The process can also be utilized with a combination of resins. For example, it may be desired to employ a thermosetting resin, such as an epoxy or polyester, as the binder for the fiber reinforced material in the inner layer and it may be desired to utilize a thermoplastic resin for greater impact resistance or ductility in the outer layer. A structure of this nature can be fabricated by a similar procedure by initially degassing both the thermosetting resin mixture and the fibrous winding wound on the mandrel and then introducing the resin into the mold as previously described. After applying pressure to the resin to impregnate the resin into the fibrous material, the excess resin within the mold is withdrawn while maintaining the evacuated condition in the mold and a second degassified thermoplastic resin is introduced into the mold. Pressure is again applied to the resin within the mold and while the pressure is maintained both resins are cured. This procedure will result in an inner layer formed of fiber reinforced thermosetting resin and an outer layer of a thermoplastic resin to provide greater impact strength and ductility for the outer surface of the tubular member. It is also contemplated that the outer layer of the thermoplastic resin could be reinforced by particulate materials as described above. Furthermore, in some situations it may be desired to utilize two different thermosetting resins in the inner and outer layers, or to use two different thermoplastic resins in the layers.

FIG. 6 shows a modified form of the invention in which the reinforcing material is impregnated with the resin in an impregnation chamber and is subsequently removed from the chamber and the resin is cured in a separate curing oven.

As shown in FIG. 6, a mixing vessel 57, which is similar in construction to mixing vessel 10 of FIG. 1, contains an uncured thermosetting resin which is adapted to be discharged from the vessel 57 through a dip tube 58 that is connected by a line 59 to a reservoir 60. Valve 61 is positioned in the line 59.

A line 62 connects the line 59 with one end of an impregnation chamber 63 and a valve 64 is located in the line 62.

The impregnation chamber can take any desired shape or configuration and, as shown in FIG. 6, the chamber is provided with an open end which is adapted to be closed off by a sliding gate 65. Gate 65 is connected to the end of a ram 66 of a hydraulic cylinder 67. By withdrawing the ram 66 through operation of the cylinder 67, the gate 65 will be moved to the open position for insertion and withdrawal of the article to be impregnated. Conversely, by extending the ram 66 the gate 65 will be moved to the closed and sealed position.

A line 68 is connected to the end of the impregnation chamber 63 and a pair of branch lines 69 and 70 communicate with lines 68. Line 69 is connected to a source of air or other gas under pressure, and a valve 71 is located in the line 69, while line 70 is connected to a source of sub-atmospheric pressure, such as a vacuum pump, and valve 72 is located in line 70. In addition, a vacuum switch 73 communicates with the line 70 and is set for a predetermined sub-atmospheric pressure. The switch 73 is connected to the vacuum pump, not shown, so that the pump operation will be stopped when a predetermined vacuum has been achieved. In addition, line 74 is connected between the line 70 and a line 75 that communicates with the end of the reservoir 60. Valve 76 is located within line 74 while valves 77 and 78 are positioned in the line 75. Branch lines 79 and 80 are connected to the line 75 between the valves 77 and 78. A restricted orifice, indicated by 81, is located in the line 79 and valves 82 and 83 are connected in the lines 79 and 80, respectively.

In operation, a mandrel 84 or other supporting structure having fibrous windings 85 or other reinforcement thereon is positioned within the chamber 63. One or more wound mandrels 84 can be supported within the chamber by suitable supports indicated by 86.

As previously described in connection with the structure shown in FIG. 1, the resin is mixed within the vessels 57 under vacuum conditions to eliminate air and vapors from the liquid resin. Subsequently, a quantity of the resin is transferred from the mixing vessel 57 through the line 59 to the reservoir 60 which had previously been evacuated to eliminate air from the reservoir. At this time, with the wound mandrel located in the impregnation chamber 63 and the reservoir 60 filled with the degassed resin, the cylinder 67 is operated to extend the ram 66 and close the gate 65 to seal the chamber 63.

Valves 71 and 61 are closed and valve 72 is opened to draw a vacuum within the impregnation chamber 63 to eliminate air from the windings 85. When the preset subatmospheric pressure is achieved, the vacuum switch 73 will operate a timer which acts to control the vacuum pump and is set for a predetermined period sufficient to insure removal of the air from the windings 85.

When the air has been removed from the windings 85, the valve 72 is then closed and valve 64 is opened. However, opening of valve 64 will not cause a flow of resin into the impregnation chamber 63 due to the lack of pressure differential. With valves 82 and 83 closed, valves 77 and 78 are then opened causing the pressure to be applied to the resin in the reservoir 60 and forcing the resin through the line 62 to the impregnation chamber 63. The use of the positive pressure on the resin in reservoir 60 insures a fast delivery of the resin from the reservoir to the chamber 63. The pressure is held on the resin for a predetermined period which will insure the complete impregnation of the windings 85 with the resin. At this time, all of the resin which was formerly in the reservoir 60 will be located within the line 62 and chamber 63.

The valve 78 is then closed and valve 82 is opened to discharge the air or gas from the line 75 and reservoir 60 through the restricted orifice 81 at a slow rate. When the gas pressure has been reduced to slightly above atmospheric, valve 83 in line 80 is opened to decrease the pressure to atmospheric.

With valve 82 then closed and valve 83 open, valve 71 is opened to admit air or gas under pressure to the chamber 63 and drive the excess resin back through line 62 to the reservoir 60. At this time, the reservoir 60 will not be quite filled with the resin due to the loss of the quantity of resin used to impregnaate the windings 85.

When the resin has been returned to the reservoir 60, the valve 77 is closed, valve 64 is closed and valve 76 is opened to draw a vacuum on the head space in the reservoir 60 and remove air therefrom. Again, the vacuum switch 73 will be actuated when the pressure reaches a predetermined value which will operate the timer for a preset period. After the timer has timed out, the valve 76 is closed and the reservoir 60 then contains a quantity of resin with a small headspace under vacuum.

Valve 61 is then opened and additional degassed resin is transferred from the vessel 57 through line 59 to fill the reservoir 60.

At this time the gate 65 can be opened and the impregnated windings on mandrel 84 removed from the impregnation chamber and a second mandrel placed in the chamber, wherein the procedure is repeated.

The process of the invention can be utilized to produce a wide variety of articles and particularly tubular articles, such as pipe or conduit, or solid rods. The procedure can be employed to produce cylindrical articles or articles of other regular or irregular configurations, such as cup shape, rectangular, conical, etc. By varying the nature of the reinforcing material, as well as the resin binder system, the article produced can have a wide variety of mechanical properties for use in various applications.

Various modes of carrying out the invention are contemplated as being within the scope of the following claims particularly pointing out and distinctly claiming the subject matter which is regarded as the invention.

We claim:

1. A method of producing a reinforced plastic article, comprising the steps of disposing a layer of fibrous material within a closed mold, disposing a finely divided reinforcing material in said mold as a second layer separate from said first named layer, evacuating the mold to remove gas from the interior of the mold and from said materials, removing gas from an uncured liquid binder, introducing the degassified binder into the mold while maintaining an evacutated condition in said mold, applying pressure to the binder in excess of the pressure in the mold to drive the binder into the materials and thoroughly impregnate the same, and curing the binder while maintaining a pressure on said binder in excess of the pressure in the mold to provide an integrally bonded article.

2. The method of claim 1, wherein the binder is a thermosetting resin.

3. The method of claim 1, wherein the pressure applied to the binder is in the range of 15 to 3000 psi.

4. The method of claim 1, wherein the binder is preheated to a temperature in the range of 100° to 300°F before introducing the binder into the mold.

5. A method of forming a reinforced plastic tubular article, comprising the steps of applying a layer of fibrous reinforcing material to the outer surface of a mandrel, positioning said mandrel within a closed mold with the mandrel being disposed in spaced relation to the inner surface of the mold to provide a clearance therebetween and said fibrous material being located within said clearance, introducing a comminuted filler into said clearance as a second layer separate from said first named layer, subjecting the mold to a sub-atmospheric pressure to remove gas from the mold and from the interior of the fibrous material and from the interior of said filler, subjecting an uncured resin to sub-atmospheric pressure to remove gas from the resin, introducing the degassified resin into the mold, applying a super atmospheric pressure to the resin to drive the resin into the fibrous material and into said filler to thoroughly impregnate the fibrous material and the filler, curing the resin while maintaining a super atmospheric pressure on the resin to provide a resin-bonded reinforced tubular article.

6. The method of claim 5, wherein the fibrous material is disposed as an annular layer on the outer surface of the mandrel and said filler is disposed as an annular layer between the fibrous material and the inner surface of the mold.

* * * * *

UNITED STATES PATENT AND TRADEMARK OFFICE
CERTIFICATE OF CORRECTION

PATENT NO. : 3,975,479
DATED : August 17, 1976
INVENTOR(S) : WILLIAM GEORGE McCLEAN and ARCHIE C. ANDERSON It is certified that error appears in the above-identified patent and that said Letters Patent are hereby corrected as shown below:

Cover Page at "[75]" After "WILLIAM GEORGE McCLEAN" insert --- and ARCHIE C. ANDERSON, Milwaukee, Wisconsin.---
Column 2, Line 27, Cancel "evacutated" and substitute therefor ---evacuated---
Column 3, Line 16, Cancel "modofied" and substitute therefor ---modified---
Column 3, Line 21, After "product" insert ---produced---
Column 7, Line 37, Cancel "to" and substitute therefor ---so---
Column 7, Line 66, Cancel "shall" and substitute therefor ---shell---
Column 8, Line 6, Cancel "Without" and substitute therefor ---without---
Line 6 Cancel "inerted" and substitute therefor ---inserted---,
Column 8, Line 11, Cancel "cured" and substitute therefor ---resin---
Column 10, Line 4, Cancel "impregnaate" and substitute therefor ---impregnate---
Column 10, Line 46, Cancel "evacutated" and substitute therefor (Claim 1) ---evacuated---

Signed and Sealed this

Twenty-second Day of February 1977

[SEAL]

Attest:

RUTH C. MASON
Attesting Officer

C. MARSHALL DANN
Commissioner of Patents and Trademarks